(12) United States Patent
Sceats (10) Patent No.: US 10,570,061 B2
(45) Date of Patent: Feb. 25, 2020

(54) PROCESS FOR MANUFACTURE OF PORTLAND CEMENT

(71) Applicant: Calix Ltd., Pymble, New South Wales (AU)

(72) Inventor: Mark Sceats, Pyrmont (AU)

(73) Assignee: CALIX LTD, Pymble, NSW (AU)

( * ) Notice: Subject to any disclaimer, the term of this patent is extended or adjusted under 35 U.S.C. 154(b) by 303 days.

(21) Appl. No.: 15/039,693

(22) PCT Filed: Nov. 19, 2014

(86) PCT No.: PCT/AU2014/001054
§ 371 (c)(1),
(2) Date: May 26, 2016

(87) PCT Pub. No.: WO2015/077818
PCT Pub. Date: Jun. 4, 2015

(65) Prior Publication Data
US 2017/0050883 A1    Feb. 23, 2017

(30) Foreign Application Priority Data

Nov. 29, 2013 (AU) ............................... 2013904639

(51) Int. Cl.
*C04B 2/10* (2006.01)
*C04B 7/43* (2006.01)
(Continued)

(52) U.S. Cl.
CPC ..... *C04B 7/434* (2013.01); *C04B 2111/00017* (2013.01); *Y02P 40/121* (2015.11); *Y02P 40/18* (2015.11)

(58) Field of Classification Search
USPC ........................................ 106/638, 713, 739
See application file for complete search history.

(56) References Cited

U.S. PATENT DOCUMENTS 5,451,255 A * 9/1995 Hansen .................... C04B 7/44
106/743
2008/0090194 A1* 4/2008 Laux ........................ F27B 7/34
432/105

(Continued)

FOREIGN PATENT DOCUMENTS

EP    0 030 777 B1    3/1983
GB    1 503 159 A     3/1978
(Continued)

OTHER PUBLICATIONS

Alsop P.A. et al.; "The Cement Plant Operations Handbook," Fifth Edition, 2007, Tradeship Publications Ltd., Surrey RH4 1AR, UK.

*Primary Examiner* — James E McDonough
(74) *Attorney, Agent, or Firm* — TraskBritt (57) ABSTRACT

A method of manufacture of Portland cement clinker is described in a dry process that captures the carbon dioxide emitted from the calcination of carbonate minerals, principally limestone. The process uses an indirectly heated, counter-flow reactor to pre-heat and calcine the cement meal to produce a separate calcined meal and carbon dioxide gas stream, with external heat being provided by the combustion of a secondary fuel stream with pre-heated air. This calcined meal is injected into the conventional rotary kiln, where the hot flue gas from combustion of the primary fuel with pre-heated air is used to fuse, react and sinter the powders to form granules of cement clinker. The clinker and carbon dioxide streams are cooled by the air pre-heaters.

13 Claims, 5 Drawing Sheets

(51) Int. Cl.
      *C04B 7/00*         (2006.01)
      *C04B 7/34*         (2006.01)
      *C04B 28/00*       (2006.01)
      *C04B 32/00*       (2006.01)
      *C04B 9/12*         (2006.01)
      *C04B 28/04*       (2006.01)
      *C04B 111/00*     (2006.01)

(56) References Cited

U.S. PATENT DOCUMENTS

2008/0121142 A1*   5/2008   Comrie ................ B01D 53/508
                                                                106/707
2014/0377037 A1*  12/2014  Tiernan ..................... F27D 3/00
                                                                414/152

FOREIGN PATENT DOCUMENTS

| JP | 2004-231424 A | 8/2004 | |
|---|---|---|---|
| JP | 2004231424 A * | 8/2004 | |
| WO | WO 2012/145802 A2 | 11/2012 | |
| WO | WO-2012145802 A2 * | 11/2012 | .............. B01J 6/004 |

* cited by examiner

PROCESS FOR MANUFACTURE OF PORTLAND CEMENT

FIELD OF INVENTION

The present invention relates broadly to a process and apparatus for manufacture of Portland cement or lime which is adapted to facilitate carbon capture.

BACKGROUND

Portland cement production is an industry producing 3,400 million tonnes of cement powder per annum, and is the second largest source of man-made $CO_2$ emissions, with approximately 0.8 tonne of $CO_2$ produced per tonne of cement. Of this, about 60% derives from the $CO_2$ emitted from processing limestone $CaCO_3$ to lime $CaO$ in the production of cement clinker in a process known as calcination, and 40% arises from the burning of fossil fuels to produce the cement. The reduction of $CO_2$ emissions to reduce global warming is required, and the Portland Cement industry is under pressure to reduce its $CO_2$ emissions.

Incremental improvements to the efficiency of the production process are one approach, but substantial reductions are not possible by incremental improvements. The other approaches that have been developed include the application of post-combustion capture in which the $CO_2$ from the exhaust gas stream, which contains the $CO_2$ from both carbonate calcination and fuel combustion. Established processes, such as amine stripping, are too capital expensive, and the recent focus has been on using lime, $CaO$, as a high temperature $CO_2$ sorbent, in a process called Calcium Looping. This process is at the pilot stage of demonstration. It has the advantage that the spent $CaO$ sorbent is consumed in the Portland cement. This process has the disadvantage that the capture process is carried out at about ambient pressure and the size and cost of the plant would be very large, approaching that of the Portland cement plant itself. A significant concern is the penalty arising from the consumption of additional energy for the Calcium Looping Process. This is a cost, and adds to the scale of the plant.

Another approach is Oxy-fuel combustion in which pure oxygen is used for combustion instead of air, in which case the exhaust gas is $CO_2$ and steam, which allows the $CO_2$ to be captured by condensing the steam. The cost of a cryogenic separation plant is a very large cost, and the Portland cement plant has to be significantly redesigned to account for the very different flue gas flows through the kilns and another processes.

Portland cement plants typically use coal and waste materials as a fuel, rather than natural gas, so that approaches based on pre-combustion capture to produce a hydrogen gas stream from natural gas are generally not applicable.

Lime production is similar to that of Portland cement, except that a higher quality of limestone is used, and sand and clay is excluded to produce a lime product There is a need for a process that can significantly reduce the $CO_2$ emissions from a Portland cement or lime process without the requirement for large additional processing plants described above. In all the $CO_2$ reduction schemes considered above, the $CO_2$ must be compressed for sequestration.

Portland cement production now uses the "dry process" in which lime and sand particles fuse in the rotary kiln, compared with the "wet process" previously used in which the limestone, sand and other additives are pressed into a pellet. The dry process has a lower energy demand than the wet process. This invention is directed to the dry process.

In the dry process, limestone is received as rocks, which are crushed and ground to a particle size of less than 100 microns, and uniformly mixed with sand that has also been ground to less than 100 microns. Other ground materials, such as clay and iron oxide may be added for a particular cement formulation. Generally, the different particles streams are mixed in a hopper designed for efficient mixing to give a homogenous mixture. The dry cement process relies on an efficient mixing to promote fusion and reaction in a rotary kiln.

In the conventional dry process, the mixed powder is pre-heated by the flue gas exhaust from kiln using a pre-heater cyclone stack, which is a bank of cyclones in series. In each stage, the colder particles are heated by mixing with the hotter flue gas steams, and the equilibrated gas and particles are separated in a cyclone. This process is repeated many times in a sequence in which the temperature of the particles are raised and that of the gas is reduced. A modern plant may have up to six of these stages to achieve high heat recuperation efficiency, and thereby lower the energy demand. This staged approach of mixing and demixing approximates a counter flow heat exchanger in which the temperature of the solids is raised and that of the gas is lowered. As the temperature rises during these pre-heating stages, the calcination reaction of limestone will proceed to an extent that the $CO_2$ partial pressure is not higher than the equilibrium pressure of the calcination reaction. Up to about 30% reaction may be achieved in the pre-heater cyclone stack.

The accumulated pressure drops in each cyclone stage is high as the particles are accelerated in each stage. These pressure drops accumulate and present a significant energy penalty for operating the blowers for forcing the flue gas into the Pre-heater cyclone stack and for drawing out the flue gas.

In the conventional approach, the powder from the pre-heater cyclone stack is injected into a flash calciner where they are mixed with the hot flue gas steam from the clinker kiln described and coal. The hot flue gas stream has excess air which combusts with the coal to drive the calcination reaction towards completion such that 95% calcination is achieved and the exhaust temperature is about 900° C. The exhaust gas temperature is held below that at which the sand will begin to vitrify and calcium silicates begin to form. The solids are once again separated from the flue gas stream, adding to the pressure drop penalty. The pre-heated homogenously mixed lime and sand powders are ready for processing in the rotary kiln.

It will be appreciated that the conventional approach uses powder-gas mixing for each of the stages in the pre-heater stack and in the flash calciner. This gives very efficient heat transfer, but has the undesirable attributes of requiring many stages of powder-gas mixing and separation to achieve an over-all system thermal efficiency.

A disadvantage of the powder-gas mixing is that the exhaust flue gas may have large amounts of cement dust that needs to be separated, and re-injected into the process in order to meet emissions standards. The cost of the filter units is scaled to the gas flow, and the wear of the filter units is associated with the entrained powder. These are disadvantages of the conventional process.

The production of lime is generally carried out in kilns, which are not amenable to $CO_2$ capture described in the present disclosure. However, ground limestone, or lime kiln dust, is calcined in flash calciners similar to that described above for Portland cement. In that case, the pre-heater stack and the flash calciner are augmented by a cyclone cooler which is used to pre-heat the air for combustion. It will be understood by a person skilled in the art that the benefits described in this invention in detail for Portland cement are also applicable with respect to lime production with $CO_2$ capture.

In the case of Portland cement, the pre-heated calcined hot particles are injected into the clinker kiln, which is a rotating kiln fired by a counter-current of flue gas produced from the combustion of coal to a temperature of about 1450° C. with pre-heated air. At these temperatures, the sand fuses with the lime and the particles begin to agglomerate into granules in much the same way as in silica glass manufacturing. In the granules, the reactions proceed to form the calcium silicates that define the composition of Portland cement and the granules sinter. The fusion, reaction and sintering lead to an exhaust stream of calcium silicates in the form of clinker granules of about 10-30 mm in diameter. The clinker granules are cooled by a forced air pre-heater, and then ground to form cement powder. The heated air is used in the combustion process described above. The amount of pre-heated air is sufficient to completely combust the fuel in the rotary kiln and in the flash calciner. This is a large volume of gas that flows counter to the input particles and the growing granules, and the propensity of the lighter particles and granules to be entrained in the gas stream requires a careful design of the rotary kiln.

The rotary kiln flue gas also contains volatile impurities, and an advantage of the mixing in the pre-heater cyclone stack is that these impurities, principally sulphur oxides, react with the raw feed and are oxidised to gypsum, and sequestered in the cement.

The flue gas stream exhausting from the pre-heater cyclone stack is the result of the first and second combustion processes, and contains the carbon dioxide ($CO_2$) from the calcination process. This gas stream has a propensity to comprise a significant amount of carbon monoxide generated in the combustion of the fuels in the presence of the $CO_2$. Carbon monoxide is toxic, and its emissions are regulated. The energy efficiency of the Portland cement process is reduced by the excess air that has to be injected into the combustion process and heated by it. The presence of the $CO_2$ from limestone calcination is a disadvantage of the process.

SUMMARY OF THE INVENTION

The invention aims to provide improvements to processes and apparatus for Portland cement manufacture which may overcome some or all of the above-described deficiencies of the conventional process, including without limitation one or more of:
a. facilitating carbon dioxide capture;
b. limiting the pressure drops, which allows use of a lower forced air pressure, with a reduction of power consumption;
c. allowing the input air volume flow to be optimised to achieve efficient processing in the kiln, rather than being constrained to ensure that the flue gas has sufficient excess oxygen to drive the combustion of fuel in the flash calciner;
d. minimising the volumetric flow of flue gas with entrained particles, which allows for a reduction in the filter size and cost for flue gas emissions;
e. providing additional pre-heated air to the combustion gas stream, which allows for the reduction of carbon monoxide emissions.

A first aspect of the present invention may include: A process for producing Portland cement clinker from at least crushed limestone and crushed sand including the steps of: Mixing the limestone, and the sand to form a mixed powder; calcining the mixed powder in a calciner reactor, wherein the calciner reactor is adapted to apply indirect heat generated from the combustion of a first fuel input to produce the mixed powder, and wherein the calciner reactor pre-heats the mixed power in a first segment, and reacts the pre-heated powder in a second segment to generate a first gas stream of carbon dioxide from the calcination of limestone and a separate second gas stream from the combustion of the first fuel input; Introducing the calcined mixed powder into a kiln using direct heating to produce Portland cement clinker, where the kiln is fueled by the combustion of a second fuel input mixed with air that is pre-heated by hot Portland cement clinker exiting the kiln.

Preferably, first gas stream may be cooled and compressed, and stored. The process may also include a further step in which the first fuel input is a gas mixed with air, wherein the air has been pre-heated by heat exchange with the cooling the first gas stream. More preferably, this heat exchange occurs within the solids pre-heater of the calciner reactor, such that the input mixed power and air are pre-heated by the first and second hot gas streams, without mixing of the solids with these gas streams.

Preferably, the first gas stream includes a slip stream of the exhaust gas stream from the kiln, which has sufficient excess air to provide complete combustion of that fuel. Preferably, the sand may include various setting additives including setting catalysts and retardants.

A second aspect of the present invention discloses a means of production of Portland cement in which the $CO_2$ from the carbonate calcination is available for capture as pure gas stream by a change in the process flow of a conventional Portland cement plant. This invention does not capture the $CO_2$ from the fuel combustion, and is therefore limited to reduction of emissions by 60%. This is a very significant reduction. The invention may operate with any carbon capture processes for the flue gas stream. If the fuel used was a biofuel waste, then zero-emissions may be achieved.

A third aspect of the present invention may include a process for producing lime from limestone powder, including the steps of: Calcining the limestone powder in a calciner reactor, wherein the calciner reactor is adapted to apply indirect heat generated from the combustion of a fuel input to produce a preheated mixed powder, and wherein the calciner reactor generates a first gas stream of carbon dioxide from the calcination of limestone and a separate second gas stream from the combustion of the first fuel input; Cooling the calcined powder in a heat exchanger, such that the preheated air is used in the combustion.

Preferably, the powder is preheated prior to calcining the powder. Preferably, the first gas stream is cooled and compressed, and stored. More preferably, the first fuel input is a gas mixed with air, wherein the air has been pre-heated by heat exchange with the cooling the first gas stream.

A fourth aspect of the present invention may include a means of production of Portland cement in which the amount of flue gas that has entrained cement particles is significantly reduced from the conventional process in which the flue gas from combustion of the first and the second combustors are mixed with the input powder stream. The first combustor generally consumes at least around 60% of the fuel, and the second combustor consumes at least around 30% of the fuel. In the present disclosure, powder is mixed only with the second flue gas stream, and this cement powder is separated using conventional cyclones such that the size of the flue gas filter unit is significantly decreased.

A fifth aspect of the present invention may include a means of production of Portland cement in which the production of carbon monoxide in the flue gas is significantly reduced from the conventional process. In the present invention, the hot carbon dioxide is replaced in the gas stream by pre-heated air such that the first combustion process to completion such that carbon monoxide production is greatly reduced.

A sixth aspect of the invention discloses the use of a slip stream of the mixed power that is injected into the flue gas from the kiln. This powder stream is pre-heated by the hot flue gas to a temperature in which volatile compounds, principally oxides of sulphur, react with the power to form non-volatile compounds, such as calcium sulphate, which is sequestered into the cement when the powder steam is calcined and mixed with the primary calcined powder steam, and processed to cement in the kiln.

In preferred embodiments the raw feed crushing and grinding, and the clinker grinding processes may be essentially unchanged from those already known. The rotary kiln and the clinker cooler, may be substantially the same those already known in the art. The processes of powder mixing, pre-heating and flash calcination are changed from direct heating to indirect heating to enable carbon capture.

Other aspects of this present invention may further disclose a modification of the pre-heater cyclone stack and the flash calciner that uses indirect heating in which the flue gases and the process streams are purposefully not mixed. In that context, it is noted that the $CO_2$ from calcination is mixed with flue gas from the coal combustion and the input gas stream from the clinker kiln, and that the use of an indirect system of calcination and heat transfer will not mix the $CO_2$ from calcination and the flue gases.

In one form, the invention disclosure provides a method and means of manufacture of Portland cement in which the carbon dioxide from the calcination of carbonates, principally limestone, is produced as a separate stream of carbon dioxide, which may be compressed of liquefied for sequestration or other uses, with the primary intent that it is not emitted.

The disclosure provides a process in which the ground carbonate minerals, principally limestone, are pre-heated and calcined in an indirect heated counter-flow flash calciner reactor such that the output of the reactor is a gas stream of essentially pure $CO_2$ and a solids stream of hot lime. The heat for the reaction is provided by heat transfer across the walls of this reactor by the combustion of fuel and pre-heated air in a separate chamber.

Other aspects of the disclosure relate to the processes of pre-heating the premixed sand and other additives by the flue gas stream, preferably by indirect heating in a solids-gas heat exchanger, and the homogenous mixing of this stream with the hot lime for injection into the rotary kiln. The subsequent processes of fusion and sintering in the rotary kiln to produce clinker, cooling the clinker by an air pre-heater and grinding the cooled clinker may be substantially the same as the conventional process for production of Portland cement.

The pre-heating of the air for the combustor of the indirectly heated is preferably achieved by cooling of the $CO_2$ gas stream, with any additional pre-heating heating coming from the flue gas of this calciner. This means that the air demand required for the rotary kiln is not dictated by the need to have excess air in the flue gas exhaust for this combustion.

In another form, the limestone, sand and other additives are mixed before pre-heating and calcination in the indirect heated counter-flow reactor. This form entails a larger reactor because it must pre-heat the sand and other additives. This is not a preferred embodiment because of the potential for the sand and lime to commence their reaction in this reactor, which might lead to a build-up of a glassy insulating layer of material on the walls of the reactor.

The cooling of the $CO_2$ gas stream is preferably achieved by pre-heating of an air stream for the combustor of the indirectly heated calciner. This air stream augments the pre-heated air from the clinker cooler such that excess oxygen is increased and the combustion produces minimal carbon monoxide. The replacement of the hot $CO_2$ gas stream by a pre-heated air gas steam means that the heat losses from the plant are minimised and the thermal efficiency of the process is similar to that of the conventional process.

Pre-heating of the solids using indirect heating from the flue gas is such that the pressure drop of the flue gas is determined by typical gas friction effects, and is greatly reduced compared to that of the conventional process because these gas streams do not experience the gas pressure drops from accelerating the powders in multiple cyclones. This reduces the power required to draw the flue gases through the plant, for both first and second combustion processes.

The separation of the rotary kiln flue gas from the calciner flue gas is such that the wear on the calciner and the powder pre-heater refractories from entrained cement particles is significantly reduced or eliminated. The powders introduced into the pre-heater and calciner flow down the tubes at low velocities, typically around less than 5 meters per second, such that there is very little wear on the reactor steel.

In the production of lime from limestone, the feed is a substantially pure limestone powder. The benefits of the invention described above for Portland cement apply to lime, except that the limestone feed is generally of a quality that sequestration of volatiles is not required, and would degrade the product quality. For most limestone applications, a higher degree of calcination is required, and for such applications a small reactor, such as a fluidised bed, would be used to reduce the calcination from around 93-96% achieved in this invention, to 99% or higher. The amount of $CO_2$ lost in this process is very small, so that conventional fluidised bed reactors may be used. The lime product may be cooled in conventional heat exchangers to pre-heat the air for combustion.

It would be recognized by a person skilled in the art that there are a number of alternative process for recuperation of heat from hot flue gas and solids product steams that may be applied to optimise the performance of the indirect counter-flow calcination processes described herein, without departing from the production of a separate, relatively pure $CO_2$ exhaust stream from the flash calciner as described herein, by contrast to the conventional flash calciner which mixes the powder, the fuel, and in the case of Portland cement, the rotary kiln flue gas, in a single reactor such that the $CO_2$ from the carbonate calcination is mixed with the flue gas components principally nitrogen, steam and excess oxygen.

Further forms of the invention will be apparent from the description and drawings, and from the claims.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION OF PREFERRED EMBODIMENTS

Figure 1:
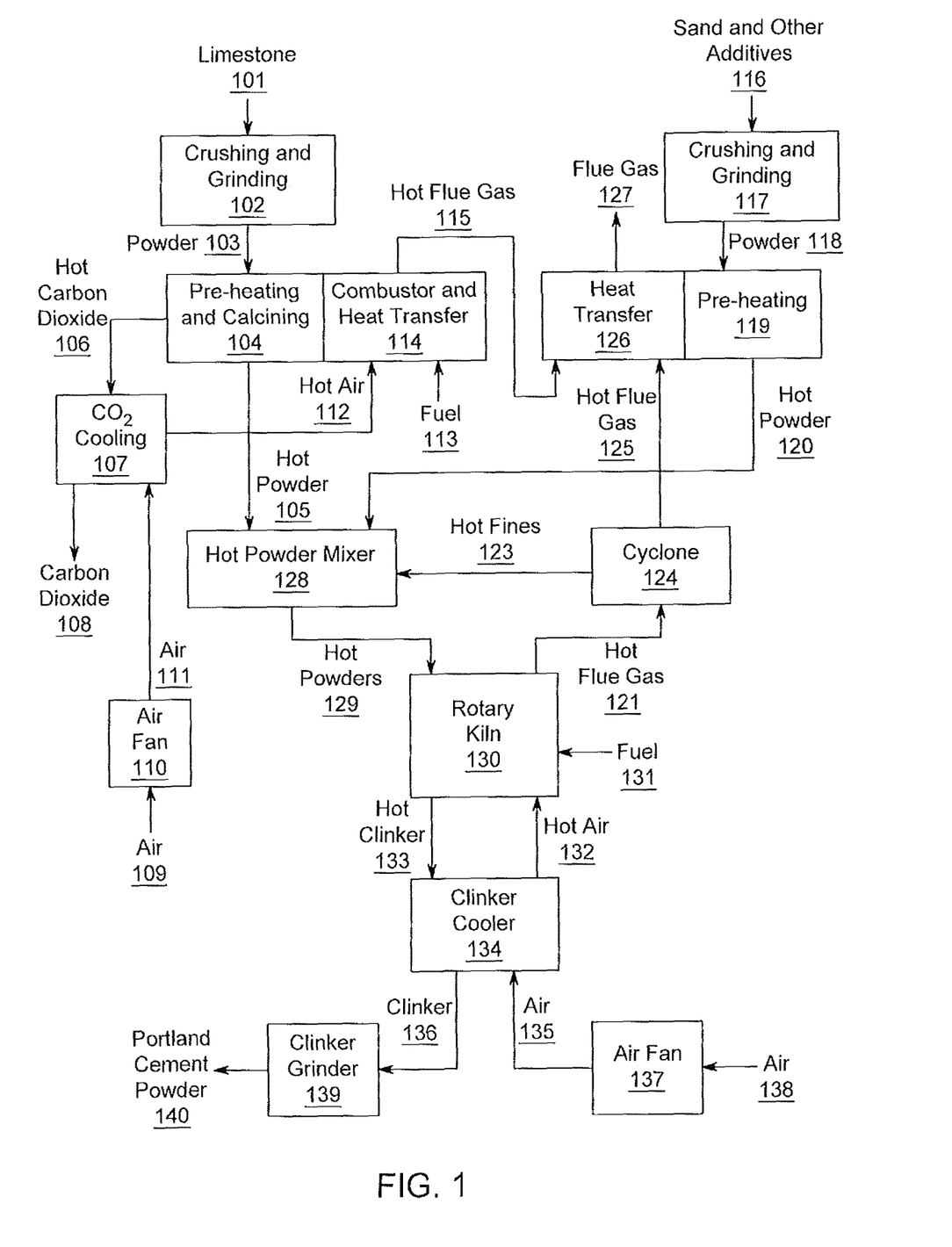
FIG. 1 shows a schematic drawing of a process for production of Portland cement clinker and a relatively pure $CO_2$ stream as per a first preferred embodiment.

The invention required to manufacture of Portland cement can be described by consideration of the process flow of FIG. 1.

In this embodiment, the raw limestone rock 101 is crushed and ground in a crushing and grinding plant 102 to a powder 103 with a particle size less than 100 microns. This plant 102 may be the same as used in a conventional Portland cement process.

The limestone powder stream 103 is processed in a counter-flow indirect pre-heater and flash calciner 104 to produce a hot lime stream 105 and a separate hot $CO_2$ stream 106. This hot $CO_2$ stream is cooled in a gas-gas heat exchanger 107 to produce a cool $CO_2$ gas stream 108, which can be further cooled and compressed, and liquefied if required. To reduce the carbon footprint from Portland cement production, this gas stream 108 is not emitted.

The air input 109 for cooling the $CO_2$ is pressurized by a fan 110 and the air stream 111 is heated in the gas-gas heat exchanger to provide a pre-heated air stream 112 that is combusted with fuel 113 in the external combustor and heat transfer plant 114 to provide the energy for the pre-heating and calcining reactor 104. The pre-heated flue gas stream 115 has significant thermal energy.

Figure 2:
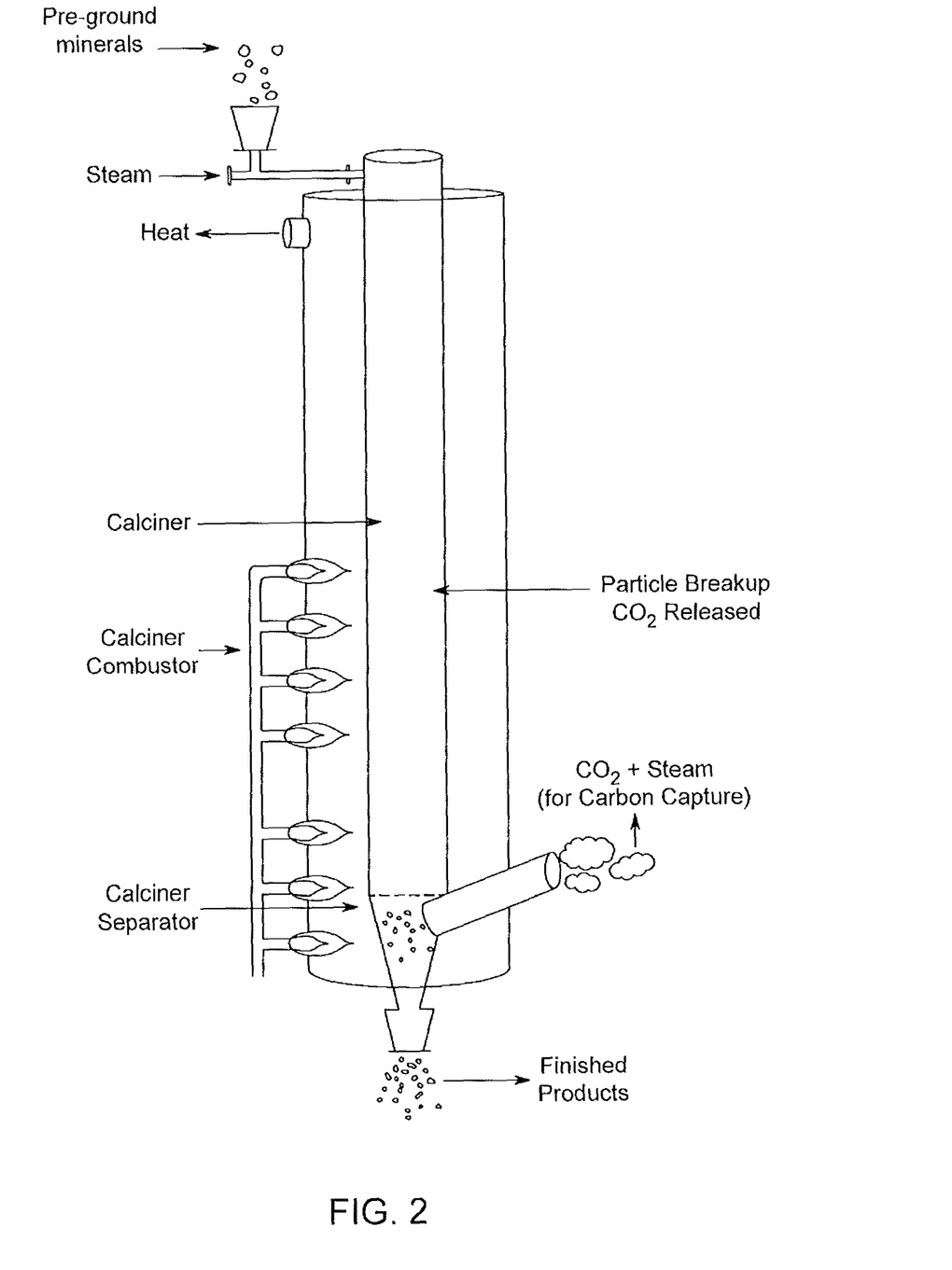
FIG. 2 shows a cross sectional schematic view of an example flash calciner reactor suitable for use with the first preferred embodiment of the present invention.

A suitable pre-heater and calciner reactor is of the type described by Sceats, for example in Published PCT Patent Application No. WO2012/145802 (incorporated herein by reference) that uses steam to entrain the carbonate particles into the reactor. A schematic illustration of an example flash calciner reactor is illustrated in FIG. 2 hereof.

In one embodiment, the amount of steam injection is minimised to ensure that the energy demand from generation and pre-heating steam is minimised, so that the powder initially moves down the reactor initially dominated by gravitational flow, with the gas-particle coupling becoming increasingly important as the $CO_2$ is evolved.

The use of a low steam content, for example less than 5% steam to limestone mass ratio requires an increased length of the calciner, because of the reduced steam catalysis, and increases the requirement of the exhaust temperature of the calcined lime, namely greater than about 900° C., so that the partial pressure of $CO_2$, approximately at ambient pressure, is less than the equilibrium $CO_2$ pressure. This requires a high wall temperature of the reactor, and this specification can be met, for example, preferably by high nickel-chromium steels, or high radiance refractory materials near the exhaust of the reactor at the base. The limestone powder is injected at low temperature, near ambient in this embodiment, and the upper part of the reactor is used to pre-heat the solids. In this region, the walls can be constructed of stainless steels, and the design may be more typical of solids-gas heat exchangers.

It will be appreciated by a person skilled in the art that the mechanism of heat transfer from the reactor walls to the powder will vary down the reactor, from conduction, to convection and to radiative heat transfer and a number of baffle designs inside the reactor can be used to maximise the heat transfer to minimise the reactor length. For example intermediate hoppers and rotary valves can be used to hold up the solids, and mixers can be used to increase the turbulence and to break up the gravitational acceleration. The heated combustion gas from the external cornbustor and heat transfer unit is injected into the pre-heater calciner to provide the required temperature profile along the calciner walls, and provide the necessary heat up the reactor. The preferable temperature profile is one in which the temperature is maximised at the exhaust of the reactor. The counterflow of the heating gas is such that the exhaust flue gas steam 115 is at a low temperature as possible by virtue of the heat transfer to the powder through the reactor. The reactor may be comprised of a number of segments to enable the transition between heat transfer regimes, and may comprise a number of downer and riser segments.

The sand, and other additives, 116 are mixed and ground in a crushing and grinding plant 117 to a sand powder 118, also with a particle size also less than 100 microns. This plant may be the same as used for a conventional Portland cement process.

In contrast to the conventional process, in this embodiment, the powder streams 103 and 118 are not homogenized at ambient conditions. Instead, the two streams are separately processed and pre-heated, and homogenized at high temperature. It will be further understood that the preferred approach to this embodiment is to separate the limestone and sand streams to reduce the heating load on the pre-heating calciner 104, to reflect the fact that indirect heating carries an efficiency penalty. The primary benefit of indirect heating is that the pure $CO_2$ stream is extracted as the hot gas stream 106, for heat recovery and sequestration by any suitable process, to reduce the $CO_2$ emissions.

The sand powder 118 is pre-heated in the solids gas heat exchanger comprising the solids pre-heating unit 119 to produce the pre-heated sand stream 120. The gas side of the heat exchanger provides heat from the hot flue gas 115 from the pre-heater calciner 104 and the hot flue gas 121 from the rotary kiln 130, which is substantially scrubbed of the hot fines 123 in the cyclone 124 to give a hot flue gas 125 for injection into the heat exchanger unit 126, along with the hot flue gas stream 115. This heat exchanger design may take account of the higher temperature of the hot flue gas stream 125 compared to the hot flue gas stream 115, for example by using less hot flue gas 115 in a pre-heating section of the heat exchanger unit 126. The temperature of the flue gas steam 127 after heat recuperation should be as low as possible to reflect the energy efficiency of the Portland cement production process described herein. This gas stream generally contains $CO_2$ from the combustion of the fuel inputs to the plant.

The pre-heated lime powder 105, the pre-heated sand powder 120 and the hot fines 123 are homogenously mixed in the powder mixer 128 to give a hot powder stream 129. In the rotary kiln 130, the lime and sand particles fuse, react and sinter to produce cement clinker granules 133. Compared to the conventional dry process for production of Portland cement, the pre-heated lime powder 105 produced from the pre-heating calciner 104 has a larger surface area because the monotonically increasing temperature profile of the particle flows through the reactor minimises sintering. These particles have higher reactivity, compared to that produced by a conventional flash calciner, and the solids-solids reaction in the calciner will occur more readily.

The kiln is fired by fuel 131 combustion, with a hot air stream 132. The hot flue gas at about 1450° C. causes the lime, sand and additives to fuse, react and sinter to produce the calcium silicates of the Portland cement. The fusion grows the materials into granules, and this granular stream is ejected from the rotary kiln 130 as the hot cement clinker granules 133. The hot clinker granules 133 are cooled in the clinker cooler 134 to give the clinker stream 136 in the clinker cooler 134, which pre-heats the forced air stream 135 to the heated stream 132. The cooled clinker 136 is ground to cement powder 140 in the grinder plant 139, as per the conventional process. The air fan 137 pressurises the input air stream 138.

In a further advantage of the described example embodiment, it will be understood by a person skilled in the art that the pressure drop of gas from the input air 132 to the flue exhaust 127 is less than that required for the conventional process in which the air has to drive against the solids streams for up to about six stages of solids-gas mixing, and cyclone separation.

In an unillustrated embodiment, the air stream 112 may contain a slip stream of the flue gas 121.

In another unillustrated embodiment, the limestone powder 103 and sand powder streams 118 may be homogenously mixed before being pre-heated by the kiln flue gas 121 and injected into the pre-heater and calciner 104.

Figure 3:
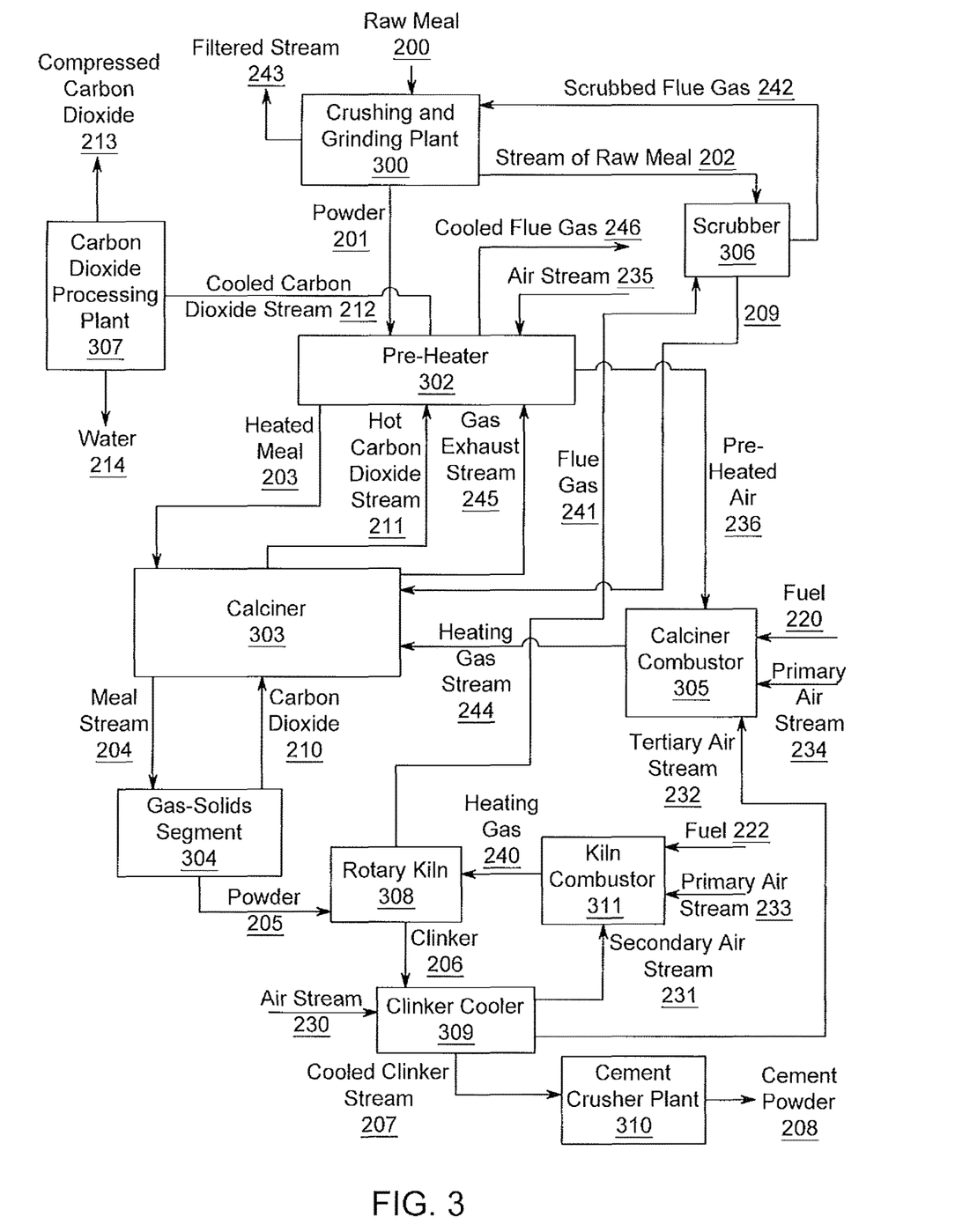
FIG. 3 shows a schematic drawing of a process for the production of lime and a relatively pure $CO_2$ stream.

Referring now to FIG. 3, of the present disclosure, the crusher and grinder plant 300 receives a mixed powder 201 of raw meal with particles less than about 100 microns, from a feed 200 of limestone, sand and clay. The moisture in the raw meal powder 201 is controlled using waste heat from the plant. In one embodiment, the moisture is removed using the residual heat from the flue gas from the scrubber plant 306.

The calciner tower comprises a pre-heater segment 302, a calciner segment 303, a gas-solids segment 304, a calciner combustor 305 and a scrubber plant 306. In the calciner tower, the limestone in the raw meal 201 is first pre-heated and then processed to lime, with the liberation and separation of $CO_2$ and any excess moisture and hydrated water from all the compounds in the raw meal 201 being released as steam. The process output streams of the calciner tower is hot calcined powder 205 and a cooled $CO_2$ and steam stream 212. The segments 302, 303, 304 of the calciner tower described herein are a unitary structure and the description of separate segments is for clarity purposes.

Detailed descriptions of the calciner segment 303 and the pre-heater segment 302 are shown in FIG. 3. The scrubber 306 is used to extract at least some of the volatile compounds from the flue gas 241 from rotary kiln plant 308, and to cool flue gas 241 so that it can be vented to the atmosphere or captured. The rotary kiln 308 uses a slip steam of raw meal 202, which is heated and the hot solids is mixed with the primary pre-heated meal 203 for calcination. The scrubbed flue gas 242 is used to remove moisture in the Crusher and Grinder plant 300.

The $CO_2$ processing plant 307 takes the cooled $CO_2$ and steam stream 212 and processes it to extract the water and compress the $CO_2$ 213 for sequestration. The plant comprises coolers and compressors, with dewatering, to give a compressed $CO_2$ steam at about 136 bar.

The kiln plant comprises a rotary kiln 308 that produces clinker 206, a clinker cooler 309 and a kiln combustor 311.

In this plant the calcined powder 205 is transformed to balls of clinker 206 of about 30 mm size. A cooled clinker stream 207 is crushed to produce cement powder 208 in the cement crusher plant 310. The process streams will be considered in detail below.

The crusher grinder plant 300, kiln plant 308 and cement crusher plant 310 are standard plant equipment associated with the production of Portland cement. Thus the crusher and grinder plant 300, the kiln plant 308 and the cement crusher plant 310 are unchanged by the invention described herein.

Figure 5:
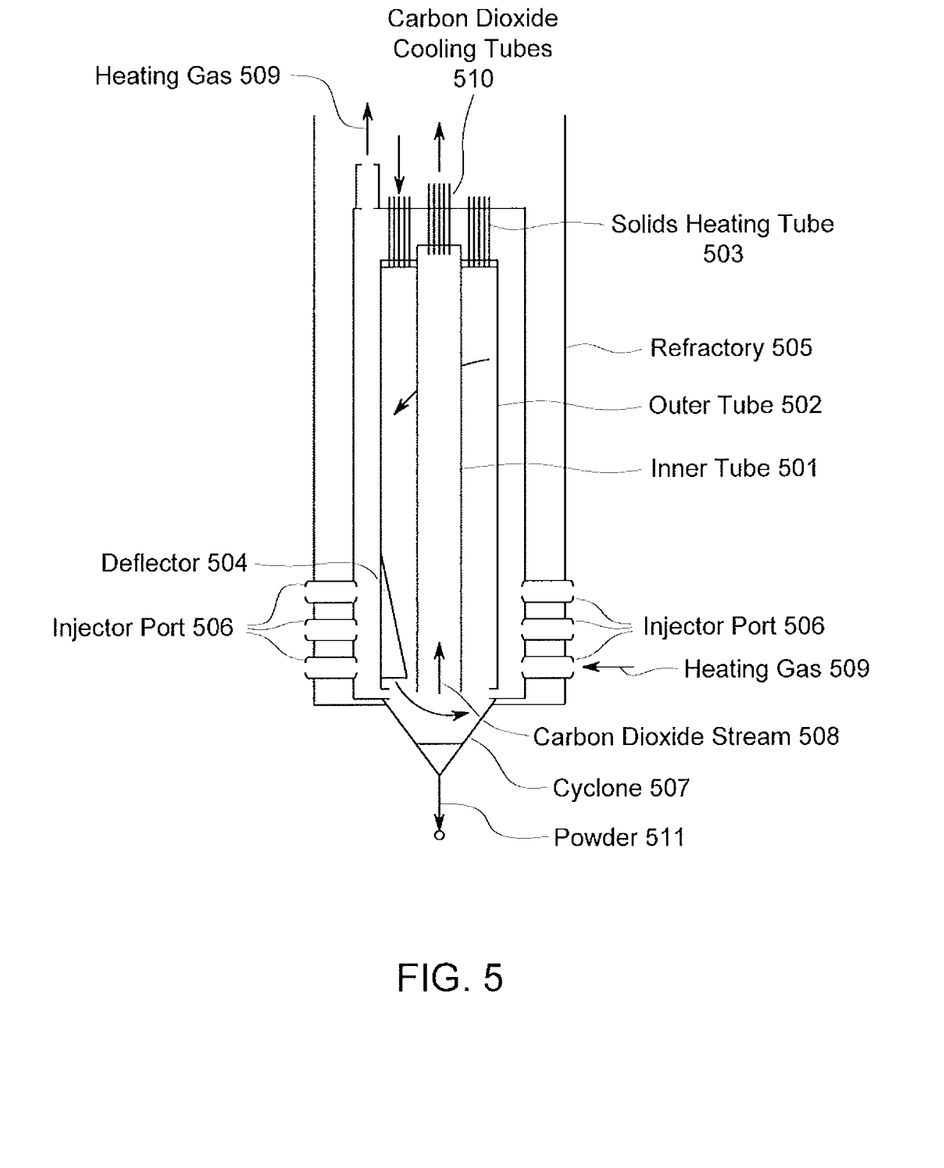
FIG. 5 shows a cross section schematic view of an example of a flash calciner reactor.

The description presented below describes the processing in a single reactor tube as shown in FIG. 2 and FIG. 5. A large cement plant would commonly employ the use of said single reactor for the production of Portland cement. In the present embodiment, the reactor tube can process 240 tonnes per day of raw meal, therefore a cement plant operating at maximum efficiency producing about 5,000 tonnes of cement per day would have a reactor plant comprising a minimum of 32 reactor tubes in across four modules, each comprising eight tubes per module.

The detailed process steps shown in FIG. 3 are now described. A raw meal 200 comprising a mixture of limestone, sand and clay are fed into crusher grinder plant 400 ground and crushed to the raw meal powder 201, being a mixed powder 201.

The mixed powder 201 is processed in the pre-heater segment 302 and the secondary output stream of raw meal 202 is processed in the scrubber plant 306. The pre-heating segment 302 of the plant pre-heats the raw meal powder 201. The pre-heater 302 serves a number of functions; to pre-heat the raw meal 202 to a pre-heated meal stream 204, and to pre-heat an air stream 235 to a pre-heated air stream 236 that is later used in the calciner combustor. The energy for pre-heating these streams comes for the heating gas exhaust 245 and the hot $CO_2$ stream 211 from the calciner 303 are directed through the pre-heater segment 302, to produce a cooled $CO_2$ stream 212 and a cooled flue gas stream 246. The flue gas stream 246 does not require a baghouse to remove dust from the raw meal 201 because the calciner described below does not mix the heating gas streams with the raw meal steams. The amount of air injected into the pre-heater is controlled to deliver cooled flue gas and $CO_2$ at the lowest possible temperature so as to maximise the energy efficiency of the process. The optimum temperature of the heated meal 203 can be in the range of 650° C. to 850° C., but is most preferably about 730° C., which is below the onset of the calcination reaction. During pre-heating, residual moisture in the raw meal forms superheated primary heated meal steam 203, such that the stream 203 is an entrained solids-steam mixture.

The design of the pre-heater is preferably a tube-in-plate cross-flow design. Whilst in the calciner, the orientation is such that the solids meal stream flows vertically down under gravity and the hot $CO_2$ stream 211 flows vertically upwards. These two streams flow in multiple, separate pipes of typically with a 10 cm to 20 cm diameter, such that the build-up of powder in the tubes is minimised. It will be appreciated that other diameters or cross sections, such as oval or substantially rounded cross sections, may be used to reduce build-up of powder in the tubes. At the entrance of the $CO_2$ stream 211, there may be in-line micro-cyclones that filter out dust in that stream, and return any solids to the calciner 103. This ensures that the $CO_2$ exhaust stream 212 contains minimal dust fines. The cooled air stream 235 and the heating gas exhaust stream 245 flow in the pre-heater through a cross flow in ducts between pairs of plates through which the pipes described above penetrate. The ducts of these streams alternate, such that the system can employ heating and cooling ducts. The use of tube in plate cross flow commonly employs the use of two streams to transfer heat, however in the present embodiment there are four streams employed to transfer heat. One of the streams is a flow of powders entrained in steam, and the heat transfer to this stream is the notably slower than the heat transfer to the other streams.

Notwithstanding the heat transfer and the complexity of multiple flows, the pre-heater 302 has hot inputs at a lower end, and cold inputs at an upper end, such that the overall heat transfer is that of a counter-flow system. A counter-flow system such as this can increase the thermal efficiency of the plant. It would be appreciated by a person skilled in the art, that the tube lengths, diameters, spacing, duct heights and widths can be chosen to give the desired heat transfers for the mass flows specified, and are not limited to the present embodiment. There are established correlations for heat transfer rates between each of the gas and solids flows to the pre-heater. The metal tube and plate thicknesses are selected to give the required structural strength for the temperatures and temperature gradients established. In another embodiment, two pre-heater segments can be used to separate the two processes. The pre-heater is encased in refractory to minimise the loss of heat through the walls.

The calciner segment is where the innovation of this invention substantially lies. The calciner is an indirectly heated counter-flow reactor. A suitable pre-heater and calciner reactor for the present invention is disclosed above. It is the indirect heating that separates the $CO_2$ gas generated from the calcination reaction of limestone to lime from the heating gas that provides the energy for the calcination reaction.

Referring now to FIG. 5, the calciner reactor 303, 403 comprises an inner tube 501 which ducts the hot $CO_2$ gas from the gas-solids separator adjacent to cyclone 507 at the base, through the calciner to the array of solids heating tubes 503 that form the pre-heater. The tubes have an entrance shape and alignment that creates a vortex flow of the $CO_2$ gas in the calciner between the outer wall of the inner tube 501 and the inner wall of the outer tube 502, such that powder entrained in the $CO_2$ stream is ejected onto said walls, and the solids flow is directed down the walls into the cyclone separator 507. The powders are introduced into an annulus bounded by the inner tube 501 and an outer tube 502. The outer tube 502 can be fabricated from, for example, a metal, metal alloy or a ceramic, or a combination of thereof.

The powder stream comprises steam to form an entrained flow entering the calciner reactor 303, 403 in the solid heating tubes 503 from the pre-heater 302, 402, The shape of the pipes at the entrance to the reactor 303, 403 are shaped and arranged to impart a helical motion to the stream in the reactor 303, 403. This helical motion is further enhanced by helical generators 504, in the form of a deflector 504, at the base of this annulus for the calcined stream. The calcination reaction takes place in this annulus, with the heat being supplied from the outer wall of tube 501 and the inner wall of tube 502. The heating gas 509 flows in through at least one annulus formed between a refractory 505 and the outer wall of the outer tube 502 of the reactor. The heating gas is introduced into the calciner from the combustor through a plurality of heat injector ports 506 arrayed from the base with preferably two injector ports 506 at each stage offset by 180° C. The injector ports 506 are configured such that heat is applied to approximately 30% to 50% of the tube from the lower portion of the reactor 500. This allows the heat to drive the calcination of limestone and raise the temperature up to between 800° C. to 1000° C., but preferably in the range of 900-920° C. at the exhaust port(s) 509. The exhaust from the calciner segment comprises calcined meal and $CO_2$ and steam at the preferred temperature. The $CO_2$ produced in the reactor annulus is used to drive the helical flow in the exhaust port(s) 509. The heating gas is directed to apply a substantially uniform heat to outer tube 502 to avoid hot spots.

It would be appreciated by a person skilled in the art that the outer tube 502 is under considerable thermal stress. As such, the outer tube 502 requires a high thermal capacity and can be fabricated from, for example, a nickel-chromium alloy, or high radiance refractory material, or any other material suitable for high temperature environments near the exhaust port(s) 509 of the reactor 500. In some embodiments the outer tube 502 has at least one of the following properties; a high corrosion resistance, low thermal expansion, expansion resistance or any other desirable property for a highly volatile environment. Heating of the reactants occurs from one or both of the radiative and/or convective heat flows. The gas powder separator is a cyclone system 507 in which the calcined meal is separated by centrifugal and gravitational forces against the wall of the cyclone 507, such that the gas forms a counter-flow vortex that rises upwards into the inner tube 501. In the present embodiment, the gas flowing up through the inner tube is $CO_2$ stream 508 and flowing into $CO_2$ cooling tubes 510. The calcined powder 511 gathers at the base of the cyclone separator 507 and is ejected by a rotary valve or screw. In at least one embodiment the heating gas 509 can be recycled by the process to improve efficiency.

Returning to FIG. 3, the powder streams injected into the calciner are the pre-heated streams 203 and 209. Unlike conventional plants, the steams 203, 209 can be processed in separate calciner reactor tubes. The temperature of these streams can be around 800° C. or less, or more particularly 730° C. or less, such that primary heated meal stream 203 contains steam from excess moisture. The limestone in the powder is calcined to lime 204 and carbon dioxide 211 in the reactor and the exhaust temperature in the stream 204 is in the range of about 900-930° C. The heating gas 244 from the combustor is in the range of about 1500-1700° C. and is distributed along the reactor such that the wall temperature distribution (on outer tube wall 502) is within the operating range of metals and/or ceramics when under load from the absorption of heat for the reaction. The exhaust of the heating gas 245 is preferably in the range of about 950° C. to 1000° C.

Referring to FIG. 3, the hot $CO_2$ stream 210 from the gas particle separator 304 enters the calciner reactor 303 at the base and rises through the reactor 303 in the central tube described above. The $CO_2$ stream 210 loses a portion of heat to at least one of the solids streams 203, 209 and exhausts at the upper portion of the reactor $CO_2$ gas stream 211 into the array of tubes for cooling in the pre-heater segment 102. This provides a process in which there is no mixing of the calciner combustion $CO_2$ gas stream 210 with the heating gas stream 245, so that there is no need for carbon capture processes. The calcined powder and gas stream 204 is separated into the $CO_2$ gas stream 210 and the hot calcined powder is exhausted into the rotary kiln 308 from the gas particle separator 304 as stream 205.

The rotary kiln plant 308 process is similar to that used in conventional cement plants. The calcined powder is injected into the rotary kiln 308 where it is heated to between 1300 to 1600° C., generally the powder is heated to approximately 1450° C. The vitrification of the silica is such that aggregation of particles takes place and the balls of material are formed and agglomerate as the reaction proceeds. The energy for the heating to form the clinker 306 is derived from the kiln combustor 311 that produces a heating gas 240. The clinker reactions are exothermic, and additional energy is only required to raise the temperature to approximately 1450° C. The exhaust gas 241 from the rotary kiln 308 is approximately 1000° C. The clinker 206 is exhausted from the rotary kiln 308 at approximately 1400° C., and is cooled in the clinker cooler 309 by air stream 230 to give a cooled clinker stream 207 which is ground to cement powder 208 in the cement grinder plant. Alternatively, the cooled clinker 207 can be stored before being ground to cement powder 208.

The processes previously described can be used to increase power efficiencies. There are many ways to arrange the process flows to deliver such efficiency, and the one described below is a preferred embodiment. The air stream 230 is used to cool the clinker 306, and the heated air is split into a secondary air stream 231 which is used, with the primary air stream 233 to burn the fuel 222 in the kiln combustor 311. The primary air stream 233 is a cold air stream that conveys the fuel 222, usually a solid, into the cornbustor 311. For a low emissions cement plant, this fuel 222 is largely a biomass or waste such that carbon emissions are minimised or eliminated from this part of the process. The tertiary air stream 232 is used in the calciner combustor 305, 405. It is mixed with the pre-heated air 236 from the pre-heater and is combusted in the calciner combustor 305, 405, along with a primary air stream 234, with the fuel 220 to produce the heating gas stream 244. This recuperation cycle is almost identical to that of the conventional plant. In at least one embodiment 60% to 70% of the fuel is combusted in the calciner combustor 305, 405, and the remaining fuel is combusted in the kiln combustor 311. A substantial difference from the conventional process is that the air stream 236 has replaced the $CO_2$ in the combustion gas exhaust, so that the kiln combustor 311 may run with additional excess air to reduce the carbon monoxide emissions with a negligible impact on the plant efficiency.

The hot gas stream 241 from the rotary kiln 308 exhaust can contain a large volume of volatile impurities, which can be reactive and condense on surfaces and create equipment blockages. In this embodiment, the hot gas stream is treated by the slip stream of solids 202 in a suspension cyclone scrubber 306. The mass flow of 241 and 202 are such that the exhaust temperature of the mixture from the scrubber 306 is about 500° C. At this temperature, a number of the impurities in the gas react with the meal to form solid compounds. These become sequestered in the heated meal 209, which is injected into the calciner reactor 303, 403, The scrubbed flue gas 242 is routed into the crusher and grinder plant 300 and is used to remove moisture from the raw meal, particularly in the grinders. The crusher grinder plant 300 can also filter the flue gas 242 prior to release into the atmosphere as filtered stream 243. The filtered stream 243 is safe to release into the atmosphere as the majority of the dust fines from the cement have been removed prior to release.

In a further embodiment, it will be understood by a person skilled in the art that the pressure drop of gas from the input air 122 to the flue exhaust 120 is less than that required for the conventional process in which the air has to drive against the solids streams for up to about six stages of solids-gas mixing, and cyclone separation. This means that the power consumption of the fans used for injecting the air (not shown), and/or pulling the flue has through the plant are significantly reduced.

Figure 4:
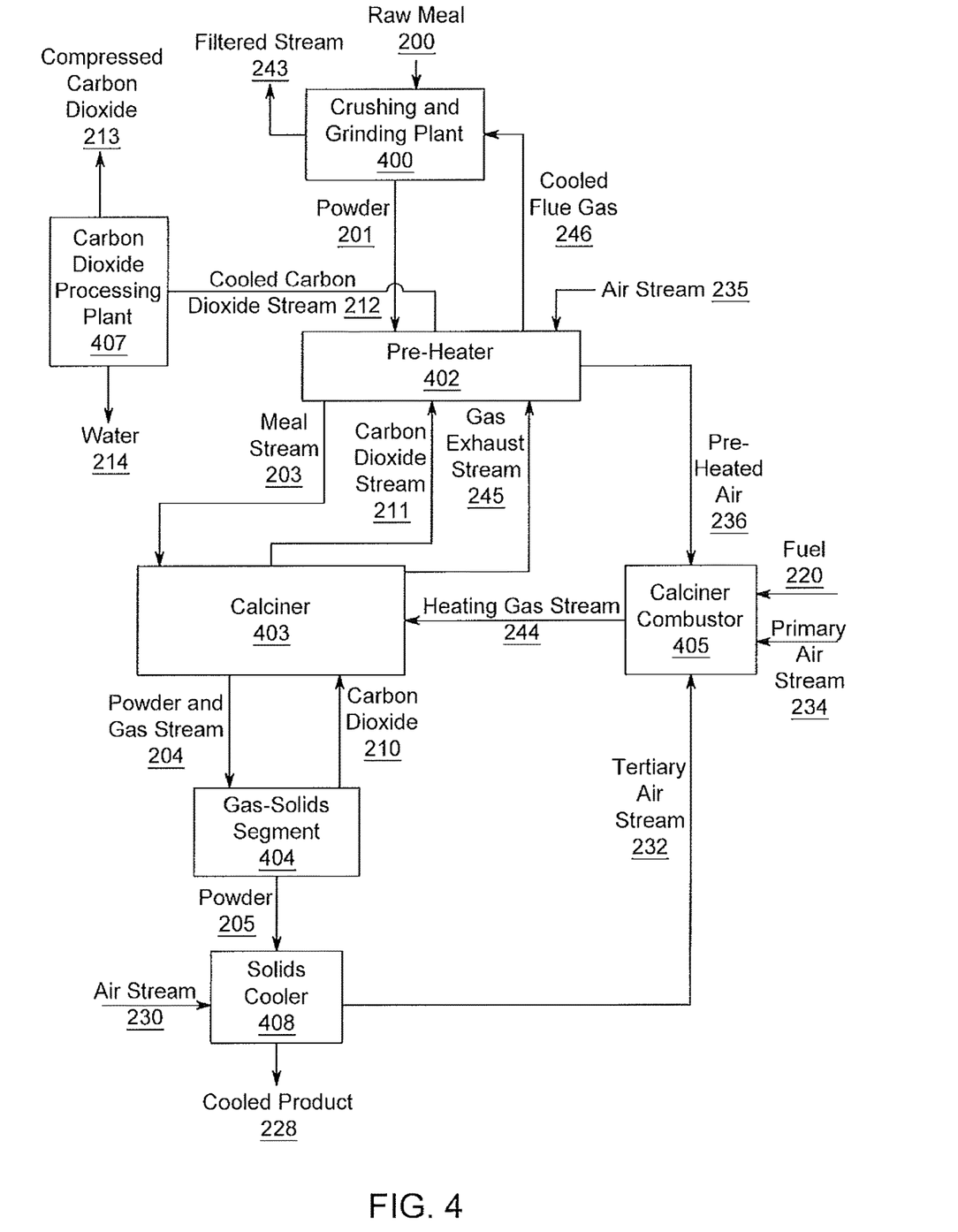
FIG. 4 shows a schematic drawing of a process for production of lime from limestone.

FIG. 4 shows an example embodiment of the process flow for lime production. For convenience, the same numbering of the processes used for the Portland cement embodiment are used. In this case, the raw meal 200 which is pure limestone and the cooled product 208 is lime. The rotary kiln and clinker grinder plants are replaced by a solids cooler 408. In the present embodiment the scrubber has been removed due to the high purity of the limestone used in the process and negligible volatile mixtures. Carbon is captured in the process similar to that described for FIG. 3 in which the cooled $CO_2$ stream 412 is fed into the $CO_2$ processing plant 407. The processing plant 407 separates and compresses the $CO_2$ 213 from the water 214. The crusher grinder plant 400 can also filter the flue gas 242 prior to release into the atmosphere as filtered stream 243. The filtered stream 243 is safe to release into the atmosphere as the majority of the dust fines from the cement have been removed prior to release.

In the case of lime 205, the lime 205 is cooled by air 230 in the solids cooler 408 to give a preheated air stream 232 for the calciner combustor 405. The solids cooler 408 can be adapted to use the cooling tube 510 and plate cross-flow system as described previously for the pre-heater 402. Therefore, hot lime can be fed into an array of pipes, and a gas, such as air, can be fed into the lower portion of the cooler where it rises through a cross-flow of an array of ducts such that air is heated in each horizontal duct, and is then directed to the next higher duct and so on. This is an efficient counter-flow system that can deliver a cool powder and a heated air stream. The use of indirect heating reduces the expose of the lime to the air, and the product can be bagged in suitable containers for storage.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A process for producing Portland cement clinker from at least crushed limestone and crushed sand and clay comprising:

mixing preheated limestone and preheated sand and clay to form a mixed powder;

applying indirect heat generated by combusting a first fuel input to the mixed powder in a calciner reactor to produce a calcined mixed powder, a first gas stream of carbon dioxide from the calcination of the limestone, and a separate second gas stream from the combustion of the first fuel input;

introducing the calcined mixed powder to a kiln;

combusting in the kiln a second fuel input mixed with air that is pre-heated by Portland cement clinker exiting the kiln; and applying direct heat generated by combusting the second fuel input and air to the calcined mixed powder in the kiln to produce Portland cement clinker.

2. The process of claim 1, further comprising pre-heating the mixed powder prior to calcining the mixed powder.

3. The process of claim 1, further comprising cooling, compressing, and storing the first gas stream.

4. The process of claim 2, further comprising cooling, compressing, and storing the first gas stream.

5. The process of claim 2, wherein the first fuel input is a gas mixed with air and the air has been pre-heated by heat exchange with the cooling the first gas stream.

6. The process of claim 3, wherein the first fuel input is a gas mixed with air and the air has been pre-heated by heat exchange with the cooling the first gas stream.

7. The process of claim 2, wherein the first gas stream includes a slip stream of the exhaust gas stream from the kiln, which has sufficient excess air to provide complete combustion of that fuel.

8. The process of claim 3, wherein the first gas stream includes a slip stream of the exhaust gas stream from the kiln, which has sufficient excess air to provide complete combustion of that fuel.

9. The process of claim 5, wherein the first fuel input includes a slip stream of the exhaust gas stream from the kiln, which has sufficient excess air to provide complete combustion of that fuel.

10. The process of claim 6, wherein the first fuel input includes a slip stream of the exhaust gas stream from the kiln, which has sufficient excess air to provide complete combustion of that fuel.

11. The process of claim 1, wherein the sand includes setting additives.

12. A process for producing Portland cement clinker, comprising:

combining preheated limestone and preheated sand and clay to form a mixed powder;

introducing the mixed powder to a calciner reactor;

combusting a first fuel input to produce heat;

indirectly heating the mixed powder in the calciner reactor to produce a calcined mixed powder and a separate stream of carbon dioxide using the heat produced by combusting the first fuel input;

introducing the calcined mixed powder to a kiln; and directly heating the calcined mixed powder in the kiln by combusting a second fuel input and air in the kiln to produce Portland cement clinker, the air in the kiln preheated by Portland cement clinker exiting the kiln.

13. A process for producing Portland cement clinker, comprising:

preheating a mixed powder comprising limestone, sand, and clay;

introducing the mixed powder to a calciner reactor;

combusting a first fuel input to produce heat;

heating the mixed powder in the calciner reactor using the heat produced by combusting the first fuel input to produce a calcined mixed powder comprising lime and a separate stream of carbon dioxide;

introducing the calcined mixed powder comprising the lime to a kiln;

using the carbon dioxide from combusting the first fuel input to preheat air to form the calcined mixed powder;

combusting a second fuel input and air in the kiln; and heating the calcined mixed powder in the kiln using the heat produced by combusting the second fuel input and air to produce Portland cement clinker, the air in the kiln preheated by Portland cement clinker exiting the kiln.

\* \* \* \* \*